Jan. 5, 1954     C. G. STOREY     2,664,638
GAUGE
Filed Oct. 6, 1951
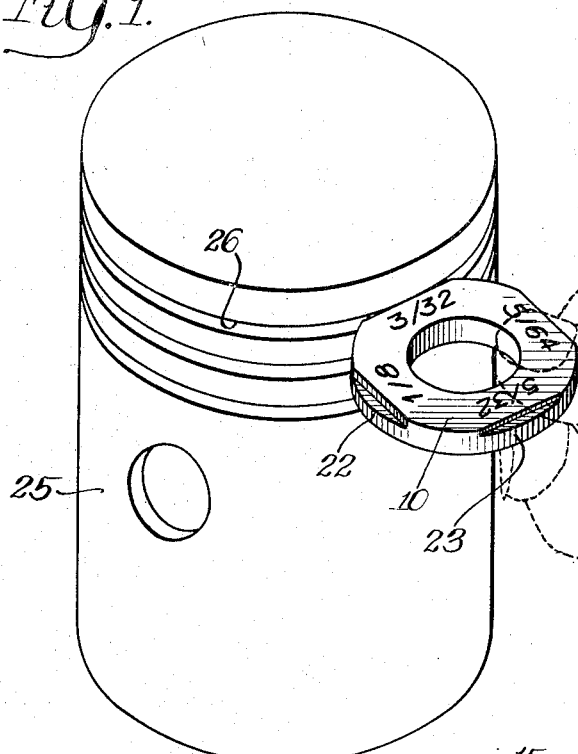
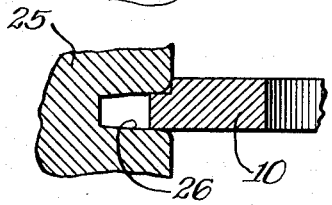
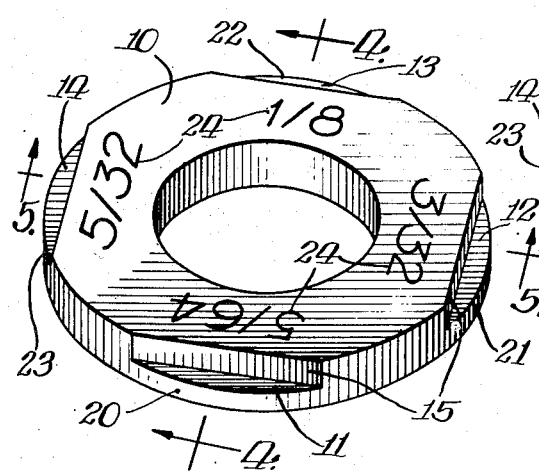
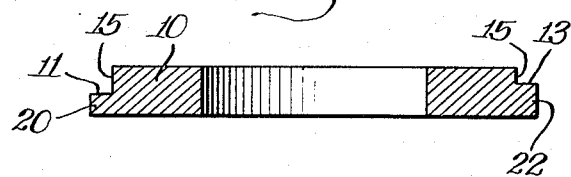
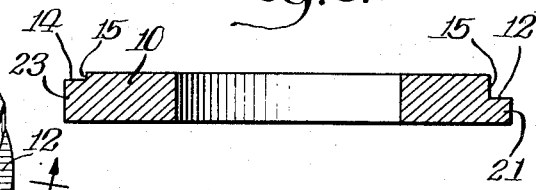
INVENTOR.
Clifford G. Storey,
BY
Davis, Lindsey, Hibben + Noyes.
Attys.

Patented Jan. 5, 1954

2,664,638

UNITED STATES PATENT OFFICE 2,664,638

GAUGE

Clifford G. Storey, Hagerstown, Ind., assignor to Perfect Circle Corporation, Hagerstown, Ind., a corporation of Indiana Application October 6, 1951, Serial No. 250,133

1 Claims. (Cl. 33—168)

1

The invention relates generally to gauges and more particularly to a gauge for checking a groove such as a piston ring groove in a piston used in an internal combustion engine.

The general object of the invention is to provide a novel gauge for checking the width of a groove of the foregoing character, the gauge being adapted for use with grooves of different standard sizes and readily demonstrating to a mechanic whether a groove should be recut to a larger standard size.

Another object is to provide a gauge of this character, which is of simple construction, is easy to use, and is highly accurate.

Other objects and advantages will become apparent from the following description taken in connection with the accompanying drawings, in which:

Fig. 1 is a perspective view showing a piston with a gauge embodying the features of the invention, the gauge being shown in operative relation to the piston.

Fig. 2 is a perspective view of the gauge.

Fig. 3 is a fragmentary longitudinal sectional view of the piston and gauge.

Fig. 4 is a sectional view taken on the line 4—4 of Fig. 2.

Fig. 5 is a sectional view taken on the line 5—5 of Fig. 2.

The piston ring grooves of pistons of the type used in internal combustion engines, particularly the top groove when more than one groove is provided, tend to wear so that too much clearance between the width of the groove and the width of the ring occurs. Such wear does not occur for the full radial depth of the groove since the groove is deeper than the radial width of the ring and consequently only those portions of the sides of the groove that are contacted by the ring will be worn. Of course, a certain amount of clearance is desirable so that the ring is free to expand and contract within the groove to permit the ring to conform accurately to the shape of the cylinder. However, when the clearance becomes excessive, there may be a tendency for the ring to cock and there is obviously greater space for oil to flow around the ring as it is removed from the cylinder wall by the ring. Loss of compression may also occur. The ring groove also tends to become bell mouthed by such wear.

The preferred practice, when a ring groove becomes too wide, is to recut the groove to a wider standard size so that the next standard thickness of ring may be used therein, or a ring of the size theretofore employed may be used with a steel spacer ring above the first-mentioned ring. There is, of course, some difference of opinion as to the amount of clearance that demands a recutting of the groove. However, it is now generally accepted that, if the clearance is greater than .005 of an inch, then the groove should be recut to a wider standard size.

A practice frequently employed at present to check the amount of clearance is to place a ring of a predetermined standard size in the groove, and then insert a feeler gauge between one side of such ring and the adjacent side of the groove to determine the amount of clearance. As heretofore stated, if such clearance is found to be .005 of an inch or over, it is deemed best to recut the groove and put in a new and wider ring.

The accuracy of width of standard rings may at times be questionable and the manner in which the mechanic utilizes the feeler gauge may result in some inaccuracy of measurement. In using the feeler gauge, he must be certain that it is inserted sufficiently to obtain a true measurement of the worn part of the groove and not merely obtain a measurement of a portion of the bell mouth. Thus, such manner of determining the width of a worn groove is not at all times dependable, nor is such an operation particularly simple if accurately performed.

The present invention is embodied in a gauge that may be readily used by the ordinary garage mechanic and will quickly impart knowledge to him of whether or not the groove should be recut. Moreover, by use of this gauge, a suitable standard may be set for determining when the clearance is excessive and the matter is not left to the mechanic's own determination as to whether a measured clearance will result in improper operation of the ring. Furthermore, the mechanic's measurements, when using this gauge, will be accurate and dependable and the chance of obtaining a deceptive measurement due to wear forming a bell mouth in the groove or due to insertion of the gauge into the unworn portion of the groove will be avoided.

As shown in the drawings, the gauge in its preferred form comprises a disk of metal, indicated at 10, which is preferably annular in form. The disk 10 is reduced in thickness at its edge in different amounts by cuts at a plurality of areas circumferentially spaced preferably at substantially uniform intervals about its outer periphery. The number of cuts depends upon the number of gauging positions desired and in the present instance I have shown four such cuts indicated at 11, 12, 13, and 14. To simplify the manufacture of the disk, the cuts are shown as being made only on one face of the disk 10. These cuts are also shown as being segment shaped, in that each is defined by an arc comprising a portion of the periphery of the disk and a chord extending across and subtending the arc. The cuts thus leave lip portions of different predetermined thicknesses, the respective lip portions being indicated at 20, 21, 22, and 23.

The cuts 11, 12, 13, and 14 are also made with a predetermined radial dimension so that each lip portion will have a predetermined width at the midpoint of its arc. Thus, the cuts form shoulders 15 with the main body of the gauge which provide a predetermined width for the lip portions.

The disk 10 is stamped with indicia, shown at 24, on one face adjacent the respective cuts or lip portions to indicate the respective nominal widths of the grooves which the lip portions are adapted to gauge. Since the gauge is intended to indicate when a groove is oversized, the respective lip portions are thicker than the nominal sizes or widths shown by the indicia. Since a groove which is .005 of an inch oversize is now generally believed to provide too much clearance between the ring and the groove, the respective lip portions in the present instance are made .005 of an inch thicker than the sizes shown by the indicia. In the present instance, there are four lip portions which have respectively $5/64$, $3/32$, $1/8$, and $5/32$ of an inch as their nominal sizes and the gauge is marked accordingly. However, as stated above, the actual thickness of each lip portion is .005 of an inch over its nominal size.

In Figs. 1 and 3, I have illustrated the manner in which this gauge may be used. Thus, in these two figures, I show a piston 25 having an upper groove 26. The gauge may be grasped between the thumb and forefinger as illustrated, with the lip portion of the nominal size for the groove 26 remote from the point at which the gauge is grasped. In the drawing, such lip portion is illustrated as having a nominal size of $3/32$ of an inch. The mechanic then attempts to insert such lip portion into the groove and if he is able to insert the lip portion into the groove far enough for the shoulder 15 to abut the piston, as shown in Figs. 1 and 3, the groove has a clearance over a standard ring for such size of .005 of an inch or more. Abutment of the shoulder 15 of the gauge with the piston indicates that the lip portion extends into the groove beyond any bell mouthing but not into an unworn portion of the groove. Such groove, under accepted practice, would be deemed to be excessive in width, and should be regrooved to the next standard dimension. In usual practice, the next standard nominal width for a groove and ring would be $1/8$ of an inch. The groove would then be recut to receive either a ring of $1/8$ standard width or to receive a ring of lesser standard width with a suitable steel spacer ring above the first-mentioned ring. If the lip portion of the gauge cannot be fully inserted into the groove so that the shoulder 15 does not touch the periphery of the piston, then it is only the bell mouthing of the groove that is being measured and a true measurement of the wear is not obtained.

With this gauge it is obviously easy for a mechanic to determine whether a groove has been worn to an excessive width. Thus, it is a simple matter for the mechanic to attempt to insert a lip portion of the proper nominal size into the groove which he is gauging. If the lip portion fully enters the groove, then he knows immediately that the groove should be recut. If he cannot fully insert the proper width lip portion in the groove, he then knows that the wear is not excessive.

With this gauge, the mechanic does not have to find, first, a ring of the proper standard size, and then insert that into the groove and thereafter work with a feeler gauge to determine the clearance. The use of such feeler gauge obviously involves the risk of inaccuracies due to the mere handling thereof as well as because of failure to insert the feeler gauge far enough or because of inserting the gauge too far into the groove. Moreover, unless the mechanic remembers exactly how much clearance is deemed to be excessive, he has to make a guess. The present gauge eliminates all of these difficulties.

I claim:

A gauge for gauging piston ring grooves in a piston, comprising a disk having a plurality of circumferentially spaced segment shaped cuts of predetermined radial width extending chordally across the disk and of different depths to reduce the thickness of the edge portion of the disk at said cuts to predetermined different amounts, thereby forming lip portions on the disk of different thicknesses adapted for insertion into the grooves to be gauged, said cuts forming straight shoulders on the disk adapted to engage the periphery of the piston when a lip portion is fully inserted into a groove, whereby the lip portion may be inserted in the groove sufficiently to extend beyond any bell mouthing of the groove but insufficiently to reach the unworn portion of the groove, the lip portions on opposite sides of any one lip portion being back of the shoulder for said one lip portion so as to clear the piston when said one lip portion is inserted in a groove.

CLIFFORD G. STOREY.

References Cited in the file of this patent

UNITED STATES PATENTS

| Number | Name | Date |
|--------|------|------|
| 188,982 | Sutton | Mar. 27, 1877 |
| 1,219,396 | Haynes | Mar. 13, 1917 |
| 1,990,430 | Fitzgerald | Feb. 5, 1935 |

FOREIGN PATENTS

| Number | Country | Date |
|--------|---------|------|
| 398,178 | England | Sept. 6, 1933 |